US006839064B2

(12) United States Patent
Nakami (10) Patent No.: US 6,839,064 B2
(45) Date of Patent: Jan. 4, 2005

(54) IMAGE FILE GENERATION

(75) Inventor: Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 10/205,572

(22) Filed: Jul. 24, 2002

(65) Prior Publication Data

US 2003/0035127 A1 Feb. 20, 2003

(30) Foreign Application Priority Data

Aug. 3, 2001 (JP) .......................................... 2001-236755

(51) Int. Cl.[7] .............................. G09G 5/36; G09G 5/00; H04N 5/76; G06F 17/30
(52) U.S. Cl. ........................ 345/556; 345/822; 345/547; 348/231.2; 707/1
(58) Field of Search ............................ 348/207.1, 207.2, 348/211.4, 222.1, 231.9, 333.02, 231.3, 254, 552, 208.99, 231.2, 231.6; 707/104, 102, 501, 522, 526, 1, 103 Y; 345/589, 591, 593, 597, 600–604, 619, 650, 676, 810, 813, 835, 838, 822, 823, 556, 547

(56) References Cited

U.S. PATENT DOCUMENTS

| 6,198,542 | B1 | * | 3/2001 | Tabata ........................ 358/1.15 |
| 6,201,571 | B1 | * | 3/2001 | Ota ............................. 348/239 |
| 6,539,116 | B2 | * | 3/2003 | Takaoka ...................... 382/229 |
| 6,771,889 | B1 | * | 8/2004 | Suga et al. ................... 386/95 |
| 2002/0030833 | A1 | * | 3/2002 | Kuwata et al. .............. 358/1.9 |
| 2002/0135687 | A1 | * | 9/2002 | Nakajima et al. ........ 348/231.3 |

* cited by examiner

Primary Examiner—Matthew C. Bella
Assistant Examiner—Wesner Sajous
(74) Attorney, Agent, or Firm—Martine & Penilla, LLP (57) ABSTRACT

A CPU 200 displays on the display screen of a display device 20 the image data of an image received file via a memory card MC or a connecting cable CV. The CPU 200 displays color-correction parameters entered via an input device 240, as well as image data that reflect the color-space parameters, on the display screen of the display device 20 together with the original image data. When it is detected that a request has been issued for application of the set color-space parameters and color-correction parameters, the CPU 200 adds the set color-space parameters and color-correction parameters to the image file as image processing control information.

23 Claims, 10 Drawing Sheets

| Offset | Meaning of information |
|---|---|
| 0 | Maker name 00x0 |
| 6 | Reserve |
| 8 | Number of local tag entries |
| 10 | Local tag 1 |
| 22 | PrintMatching |
| ~ | ~ |
| 10+12*(N-1) | Local tag N |

113 Makernote data storage area

| Offset | Meaning of information |
|---|---|
| 0 | Print Matching identifier |
| 8 | PIM Version information |
| 12 | Reserve |
| 14 | Number of specified parameters |
| 16 | First parameter number |
| 18 | First parameter setting value |
| 22 | Second parameter number |
| 24 | Second parameter setting value |
| 28 | Third parameter number |
| 30 | Third parameter setting value |
| ~ | ~ |
| n-2 | $n^{th}$ parameter setting value |
| n | $n^{th}$ parameter number |

114 PrintMatching data storage area

| Mode | Contrast | Brightness | Color balance | Saturation | Sharpness | Memory color | Noise reduction |
|---|---|---|---|---|---|---|---|
| 1 | Standard | Standard | Standard | Standard | Standard | Off | Off |
| 2 | A little soft | A little bright | Standard | A little low | A little low | Flesh color | Off |
| 3 | A little hard | Standard | Standard | A little high | A little high | Sky blue, green | Off |
| 4 | Standard | Dark | Off | Standard | A little low | Red | On |
| 5 | Standard | Dark | Off | Standard | Standard | Off | On |
| 6 | A little soft | A little bright | Low | A little high | Standard | Green | Off |
| 7 | Standard | Standard | Low | Standard | High | Off | Off |
| 8 | Hard | Standard | Standard | A little high | High | Off | Off |
| 9 | A little soft | Bright | Standard | Standard | Standard | Off | Off |
| 10 | Standard | Standard | Standard | High | A little high | Red | Off |
| 11 | Standard | A little bright | Standard | Standard | A little high | Flesh color | Off |

[Fig.11]

IMAGE FILE GENERATION

FIELD OF THE INVENTION

The present invention relates to an image file generating technique wherein additional information is added to existing image data and an image file is generated.

BACKGROUND OF THE INVENTION

There are imaging devices that are capable of generating image files containing image data and image processing conditions for the image data in an image processing device, and printers that are capable of executing image processing using the image files generated by these imaging devices. The desired image processing or, more specifically, image data to which the appropriate image processing has been applied, can be output without specifying image processing conditions when the image data are output using these imaging devices, because the desired image processing in the printer can be specified when photographing.

However, the problem exists of having to use an image file generated by an imaging device that is capable of generating an image file containing the image processing conditions together with the image data in order to obtain the abovementioned benefit. Specifically, the abovementioned benefit cannot be obtained when using an image file that is shot using an imaging device incapable of generating image files in which the image processing conditions are contained with the image data, or when using image data that are generated prior to application of an image output system that uses the abovementioned image file.

The present invention is designed to solve the abovementioned problem, and its object is to add desired image processing conditions to an image file that otherwise does not contain image processing conditions at the time of image processing.

SUMMARY OF THE INVENTION

In order to solve the abovementioned problem, the first aspect of the present invention provides an image file generating device for generating an image file containing image processing control information specifying the processing conditions of the image data in an image processing device. The image file generating device pertaining to the first aspect of the present invention is characterized by comprising original-image data display unit displaying the input image data, image processing condition setup unit setting the image processing conditions to be implemented for the image data in the image processing device, reflected image-data display unit displaying image data that reflect the set image processing conditions, image processing condition selection unit selecting the image processing conditions that are set for the reflected image-data that are displayed, image processing control information generating unit generating image processing control information on the basis of the selected image processing conditions, and image file generating unit generating an image file in which the generated image processing control information and the image data are associated and stored.

By means of the image file generating device pertaining to the first aspect of the present invention, an image file can be generated in which the input image data and the image processing control information for the image data are associated and stored. Specifically, the desired image processing conditions can be added to an image file that otherwise does not contain image processing conditions at the time of image processing. Consequently, image processing control information can be provided even for an image file which originally does not contain image processing control information, and image processing conditions can be specified and image processing executed in an image processing device that refers to image processing control information to executes image processing.

The aforementioned image processing condition setup unit may contain image processing condition display unit displaying the image processing conditions that are set in the image file generating device pertaining to the first aspect of the present invention. The image processing conditions that are set by the image processing condition setup unit may also include at least one of either color-space conversion processing conditions or color-correction processing conditions. In such a case, it becomes possible to faithfully reproduce the image data in the image processing device according to the color-space information, and the image data can also be output as preferred according to the color-correction information.

The image file generating device pertaining to the first aspect of the present invention further comprises a memory device for storing scene-specific processing conditions in which multiple image processing parameters are combined in advance according to imaging scenes, and the image processing conditions that are set by the image processing condition setup unit may consist of these scene-specific processing conditions. In such a case, image processing conditions may easily be set by selecting a photo shooting scene.

The original-image data display unit and the reflected image-data display unit may display the image data and the image data that have been caused to reflect the image processing conditions side-by-side on the same screen in the image file generating device pertaining to the first aspect of the present invention. In such a case, the image data that reflect the image processing conditions can be referred to, and the image processing conditions can thus be set more appropriately.

The image file generating device pertaining to the first aspect of the present invention may be further provided with printing unit printing the image data that reflect the set image processing conditions together with the display of the set image processing conditions. In such a case, the relationship between the output image data and the image processing conditions can be easily confirmed.

The second aspect of the present invention provides an image file generating device for generating an image file containing image processing control information that specifies the processing conditions of image data in an image processing device. The image file generating device pertaining to the second aspect of the present invention is characterized by comprising image data input unit inputting image data that accompany generation information from the time of generation, image data analysis unit analyzing the generation information, image processing control information generating unit generating image processing control information which specifies conditions for image processing of the image data in the image processing device on the basis of the results of the aforementioned analysis, and image file generating unit generating an image file in which the generated image processing control information and the image data are associated and stored.

By means of the image file generating device pertaining to the second aspect of the present invention, the image processing control information that is appropriate to the image data can be generated on the basis of the generation information of the image data, and the desired image processing conditions can be added at the time of image processing to an image file that otherwise does not contain image processing conditions. Consequently, image processing control information can be provided even for an image file which originally does not contain image processing control information, and image processing conditions can be specified and image processing executed in an image processing device that refers to image processing control information to execute image processing. In addition, user stress can be reduced when image processing control information is generated.

Information about the model of the imaging device that generates the image data is contained in the generation information, and the image processing control information may be generated according to the manner in which the model information is combined with the image output device in the image file generating device pertaining to the second aspect of the present invention. Model-specific image processing control information can be applied according to the information about the model of the imaging device. Information indicating the intended imaging arrangement at the time of image data generation is also contained in the generation information, and the image processing control information may be generated on the basis of the information that indicates the intended imaging arrangement; and the information indicating the intended imaging arrangement may comprise the imaging scene that is set in the imaging device. The image processing control information envisaged by the photographer can be generated according to the intended imaging arrangement, and the image processing device can be designed to execute the image processing envisaged by the photographer. When the intended imaging arrangement consists of an imaging scene, the image processing device can also be made to execute image processing that is appropriate to the imaging scene.

Color-space information and color-correction information may be contained in the image processing control information in the image file generating device pertaining to the second aspect of the present invention. It thus becomes possible to faithfully reproduce the image data in the image processing device by using the color-space information, and the image data can be output according to preference by using the color-correction information in the image processing device. The image data consist of Exif data that contain image data components and Exif data components which store photo information, and the generation information may consist of the photo information contained in the Exif data components. Since photo conditions, model information, and the like are contained in the Exif data, more appropriate image processing control information can be generated by utilizing these items of information.

The image file generating device pertaining to the second aspect of the present invention is further provided with image processing condition setup unit setting arbitrary image processing conditions for the image data, and the image processing control information may be generated on the basis of the set image processing conditions in addition to the aforementioned analyzed generation information. In such a case, changes can be added to the image processing control information that is generated on the basis of imaging conditions and the like, and the image processing control information can be set more appropriately.

The third aspect of the present invention provides a computer-readable medium which contains program instructions for generating an image file. The computer-readable medium pertaining to the third aspect of the present invention is characterized by comprising program instructions for inputting image data, program instructions for forming an image processing condition setup area for setting the image processing conditions for the image data thus input, program instructions for forming a original-image display area for displaying the input image data on the display screen, program instructions for forming a reflected-image display area that is adjacent to the original-image display area on the display screen and is used for displaying the image data that reflect the image processing conditions thus set; program instructions for generating image processing control information that specifies the processing conditions of the image data in the image processing device on the basis of the image processing conditions thus set, and program instructions for generating an image file in which the image processing control information thus generated and the image data are associated and stored.

By means of the computer-readable medium pertaining to the third aspect of the present invention, a original image and a reflected image can be continually compared, and more appropriate image processing control information can be generated. A useful user interface is also displayed in order to generate the image processing control information.

Color-space conversion conditions and color-correction conditions are included in the conditions that are set as the image processing conditions, and the reflected-image display area may contain a first reflected-image display area for reflecting the color-space conversion conditions thus set and a second reflected-image display area for reflecting the color-correction conditions thus set in the computer-readable medium pertaining to the third aspect of the present invention. In such a case, a original image, color-space converted image, and color-corrected image can be observed in contrast with one another. The image resulting from the application of color-correction to the color-space converted image may also be displayed in a second reflected-image display area.

The computer-readable medium pertaining to the third aspect of the present invention may be further provided with program instructions for printing the image data reflecting the set image processing conditions together with the display of the set image processing conditions. In such a case, the effects of the set image processing control information can be confirmed on the basis of the printing results, and more-appropriate image processing conditions can be set.

The fourth aspect of the present invention provides a computer-readable medium which contains program instructions for generating an image file. The computer-readable medium pertaining to the fourth aspect of the present invention is characterized by comprising program instructions for inputting image data that contain at least one of either the generated information about the model of the imaging device or the imaging conditions at the time of generation; functionality for analyzing the generation conditions; program instructions for generating image processing control information that specifies the image processing conditions for the image data in an image processing device on the basis of the generation conditions thus analyzed; and program instructions for generating an image file in which the generated image processing control information and the image data are associated and stored.

By means of the computer-readable medium pertaining to the fourth aspect of the present invention, the same functional result can be obtained as that of the image file generating device pertaining to the second aspect of the present invention. The computer-readable medium pertaining to the fourth aspect of the present invention can also be implemented by means of various embodiments in the same manner as the image file generating device pertaining to the second aspect of the present invention.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings which.

DETAILED DESCRIPTION OF THE PREFERRED EMBODIMENTS

The image file generating device pertaining to the present invention is described hereinafter based on the embodiments with reference to the figures, in the following order:

A. Structure of image file generating system with image file generating device

B. Image file configuration

C. Image file generating process

D. Other embodiments

A. Structure of Image File Generating System with Image File Generating Device

Figure 1:
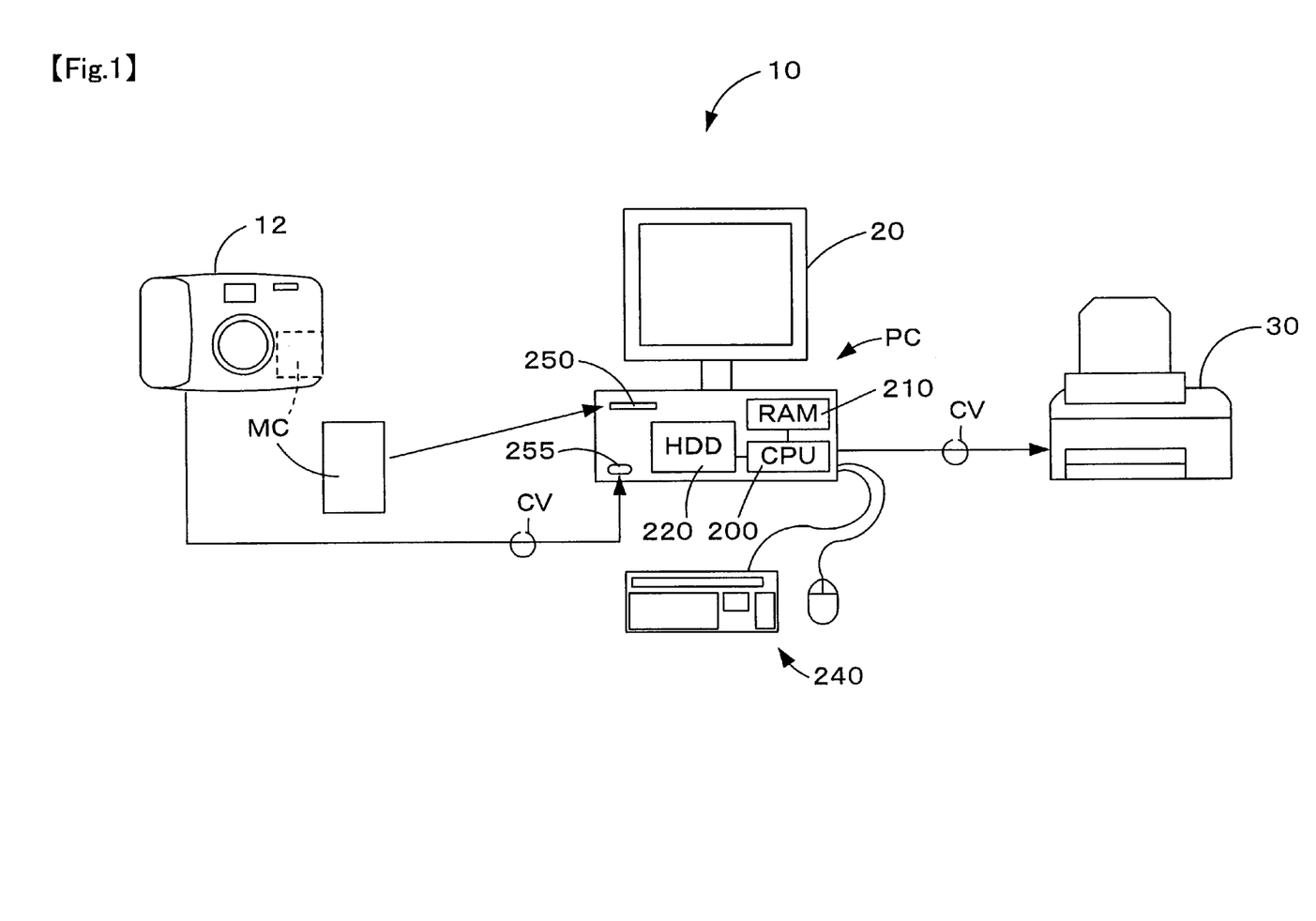
FIG. 1 is a schematic depicting an example of an image file generating system containing the image file generating device pertaining to the present embodiment.

The structure of an image file generating system with an image file generating device relating to the present embodiment is described with reference to FIG. 1. FIG. 1 is a diagram depicting an example of an image file generating system with an image file generating device relating to the present embodiment.

The image file generating system 10 comprises a digital still camera 12 as an input device for generating image data designed to add image processing conditions, a personal computer PC as an image file generating device for executing the hereinafter described image file generating process by using the image data generated by the digital still camera 12, and a color printer 30 as an output device for confirming image processing results, which are based on the image processing conditions established in the personal computer PC. The image data (image file) that can be used to generate an image file in the image file generating device relating to the present embodiment comprise image data that are input into the personal computer PC from the digital still camera 12 by means of a connecting cable CV or a memory card MC. The image data for generating an image file that can be used in the image file generating device relating to the present embodiment consist of image data stored in advance on a hard disk or similar memory device in a personal computer PC on a network or the like (not shown).

Besides a personal computer PC, a stand-alone printer provided with image file generating functionality may be used as an image file generating device. A projector or the like, or a display device such as a CRT display or an LCD display may also be used in addition to the printer 30 as an output device. The output device referred to in the following description is assumed to be a color printer 30 connected to a personal computer PC.

The personal computer PC is a computer of the type generally employed, comprising a CPU 200 for executing the image file generating program relating to the present invention; RAM 210 for temporarily storing results of calculations performed by the CPU 200, image data, and the like; a hard disk drive (HDD) 220 for storing the image file generating program; a display device 230 for displaying calculation results from the CPU 200, image data, and the like; and input devices 240, including a mouse and a keyboard for inputting commands, numerical values, and the like. The personal computer PC is provided with an input/output element 255 for connecting a connecting cable CV from a digital still camera 12, or a card slot 250 for mounting a memory card MC.

The image file generating process executed by the personal computer PC is carried out visually via the graphical user interface (GUI) of the display device 23.

The digital still camera 12 is a camera for generating digital image data by a process in which light information is converted into analog electrical signals with the aid of a CCD or photomultiplier, and the analog electrical signals thus obtained are digitized using an A/D converter. The digital image data thus generated are usually stored on a memory card MC, which serves as a memory device. The JPEG format is the common storage format for image data from a digital still camera 12, but other storage formats such as TIFF format, GIF format, BMP format, and RAW data format, may also be employed.

The image data generated by the digital still camera 12 are normally structured according to the Image File Format Standard for Digital Still Cameras (Exif). The Exif file specifications are established by the Japan Electronics and Information Technology Industries Association (JEITA).

B. Image File Configuration

Figure 2:
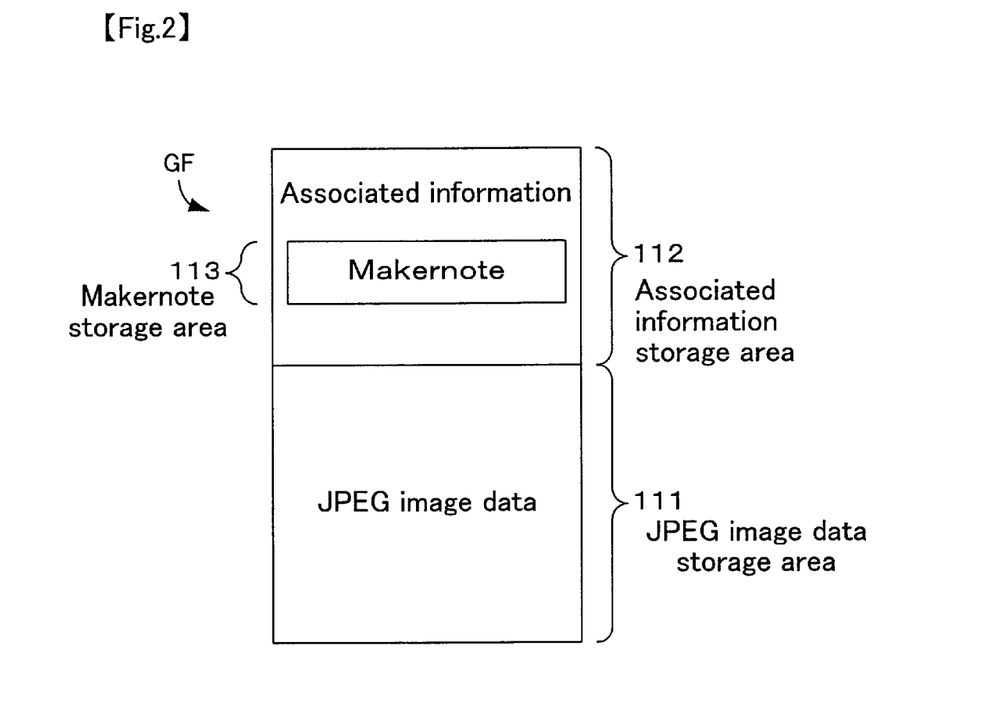
FIG. 2 is an explanatory diagram which conceptually depicts an example of the internal structure of the image file generated in the present embodiment in accordance with the Exif file format.

An explanation with reference to FIG. 2 will be given outlining the configuration of an image file generated by the image file generating device relating to the present embodiment. The terms "file structure," "data structure," and "storage area" used throughout the present embodiment refer to the appearance of files or data in a stored state within a memory device. FIG. 2 is a diagram which conceptually depicts an example of the internal configuration of an image file generated in the present embodiment in accordance with the Exif file format.

An image file GF according to the Exif file format comprises a JPEG image data storage area 111 for storing image data in JPEG format, and an associated-information storage area 112 for storing various information relating to the stored JPEG image data, as shown in FIG. 2. Information of the current photo relating to the JPEG image photographing conditions, including photo date and time, exposure, shutter speed, and the like; and thumbnail image data of the JPEG image stored in the JPEG image data storage area 111 are stored in the associated-information storage area 112. Furthermore, the associated-information storage area 112 is provided with a Makernote data storage area 113, which is an undefined area left open by the DSC manufacturer, and image processing control information CI that is added in the image file generating process of the present embodiment is stored in the Makernote data storage area 113. Specifically, the image file GF generated in the present embodiment differs from the usual Exif-format image file, in that image processing control information CI is provided in the Makernote data storage area 113. As is well known to those skilled in the art, each datum in an Exif-format file is identified using a tag known as a Makernote tag, with "Makernote" being the allocated tag name for data stored in the Makernote data storage area 113.

Figure 3:
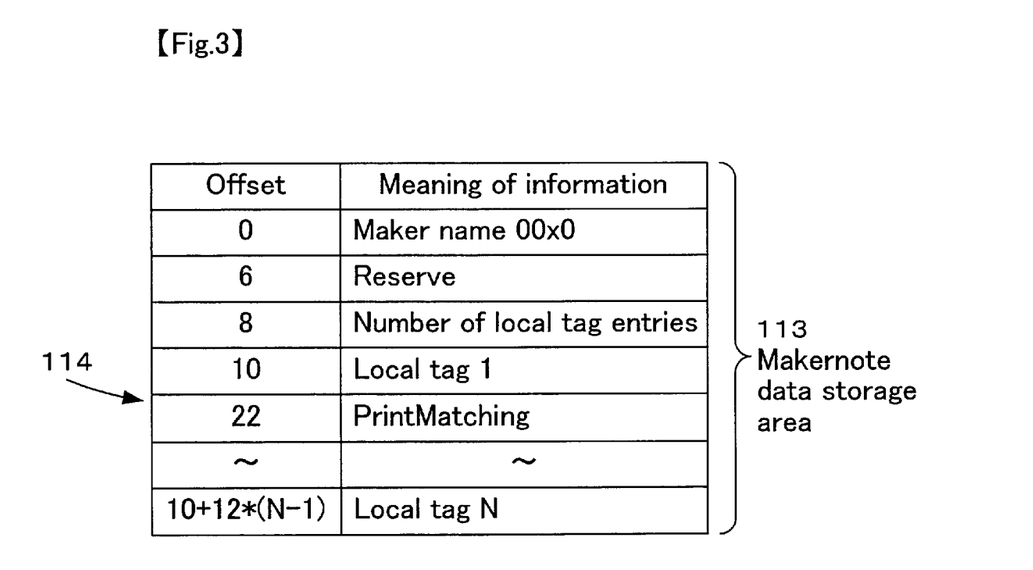
FIG. 3 is a diagram depicting the data structure of the Makernote data storage area 113 of the image file GF generated in the present embodiment.
Figure 4:
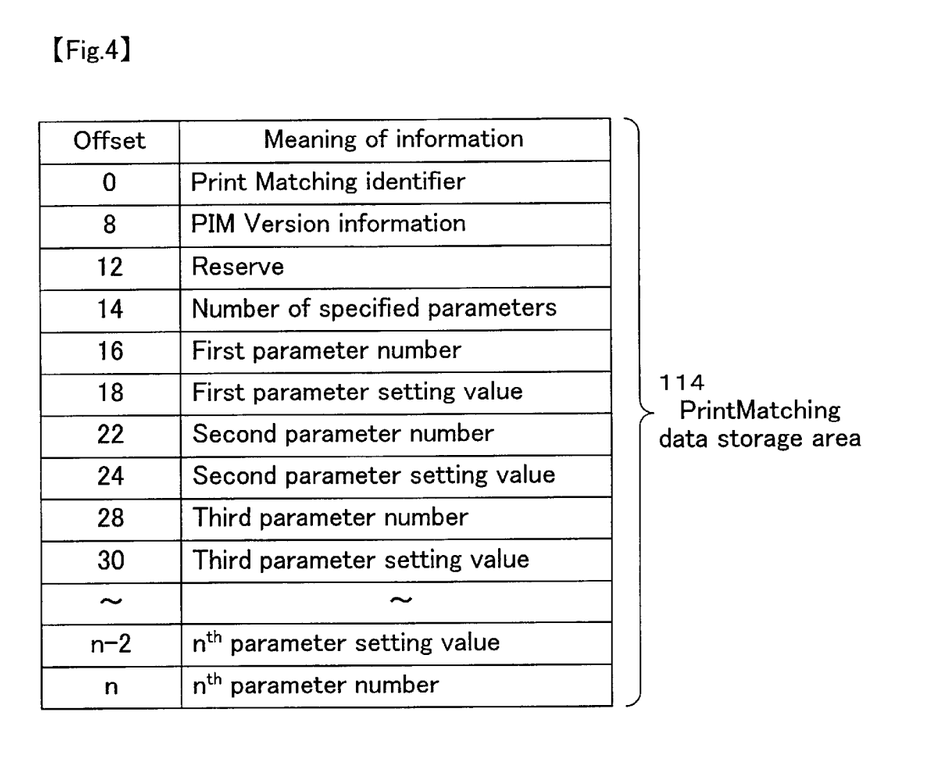
FIG. 4 is a diagram depicting the PrintMatching data storage area 114 defined within the Makernote data storage area 113 of the image file GF generated in the present embodiment.

A detailed description of the data structure in a Makernote data storage area 113 will be given with reference to FIGS. 3 and 4. FIG. 3 is a diagram depicting the data structure of the Makernote data storage area 113 of an image file GF generated in the present embodiment. FIG. 4 is a diagram depicting a PrintMatching data storage area 114 defined within the Makernote data storage area 113 of an image file GF generated in the present embodiment.

The Makernote data storage area 113 (image processing control data storage area) of the image file GF pertaining to the present embodiment is also provided with a configuration capable of identifying data that are stored using tags, and PrintMatching tags are allocated in the image processing control information CI. Each tag in the Makernote data storage area 113 is designated by a pointer according to its offset value from the top address of the Makernote data storage area 113. Information including manufacturer name (6 bytes) in the top address, followed by a reserved area (2 bytes), a local tag entry number (2 bytes), and each local tag offset (12 bytes), is stored in the Makernote data storage area 113. A 00x0 end code showing the character end-string is added after the manufacturer name.

Information including PrintMatching identifiers for indicating storage of PrintMatching parameters, parameter specification numbers for indicating the number of specified parameters, parameter numbers in which values are stored for specifying (identifying) the parameter numbers previously allocated with respect to each parameter, and parameter setting values that store setting values for the parameters of the specified parameter numbers is stored in the PrintMatching data storage area 114 (image processing control parameter storage component). Parameter numbers represent information that may, for example, be stored in a 2-byte area, and parameter setting values represent information that is stored in a 4-byte area. An output device can acquire the image processing control information CI (each parameter value) using these PrintMatching tags as an index.

The image file usable in the image file generating device relating to the present embodiment is not limited to an Exif image file EGF, and image files generated using such input devices as digital still video cameras, scanners, and the like may also be used.

C. Image File Generating Process

Figure 5:
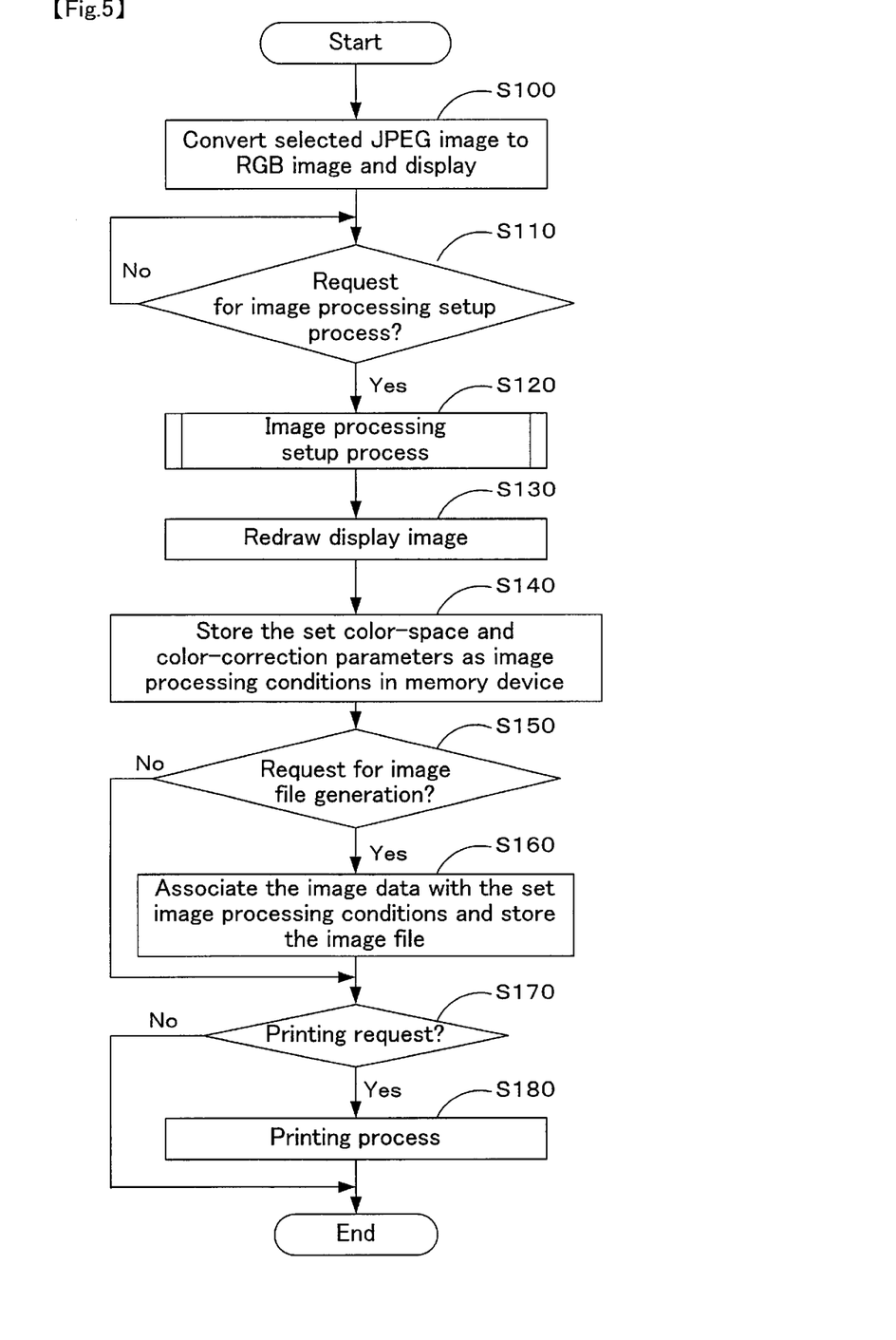
FIG. 5 is a flowchart describing the process routine in the image file generating process executed in the personal computer PC.
Figure 6:
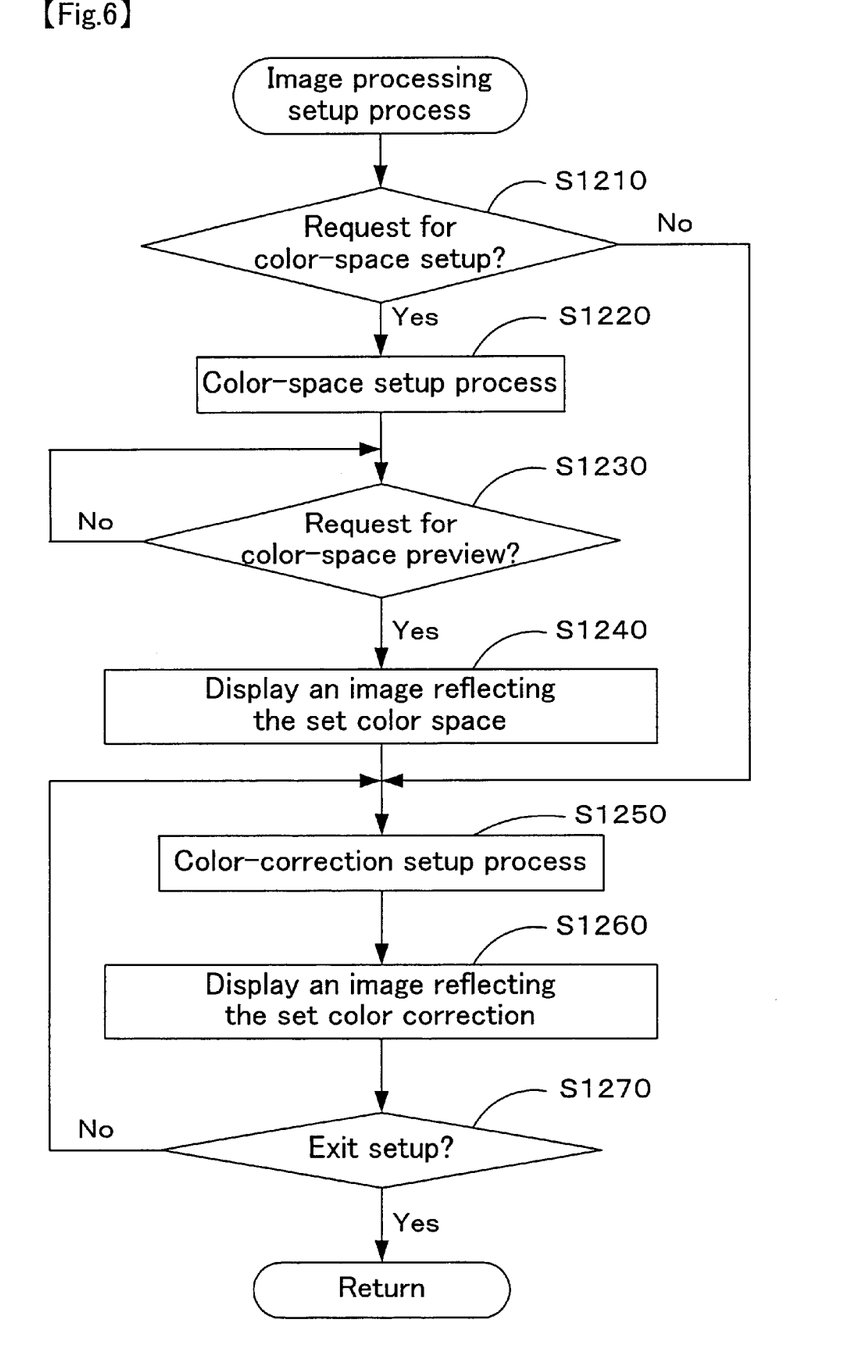
FIG. 6 is a flowchart describing the process routine of the image processing setup process within the image file generating process.
Figure 7:
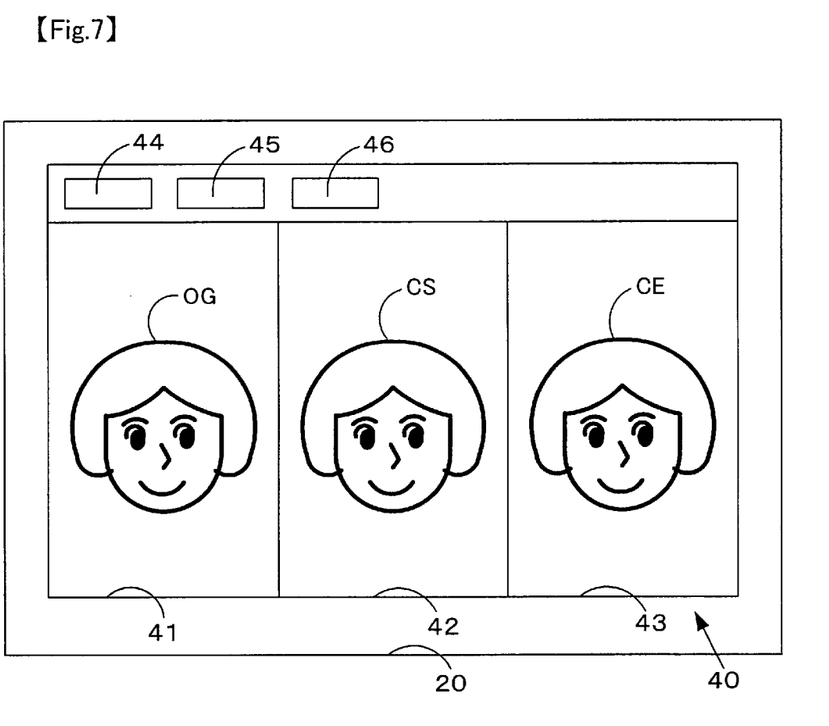
FIG. 7 is a diagram depicting an example of the image display screen that appears on the display screen of the display device 230 when a original-image file is opened.
Figure 8:
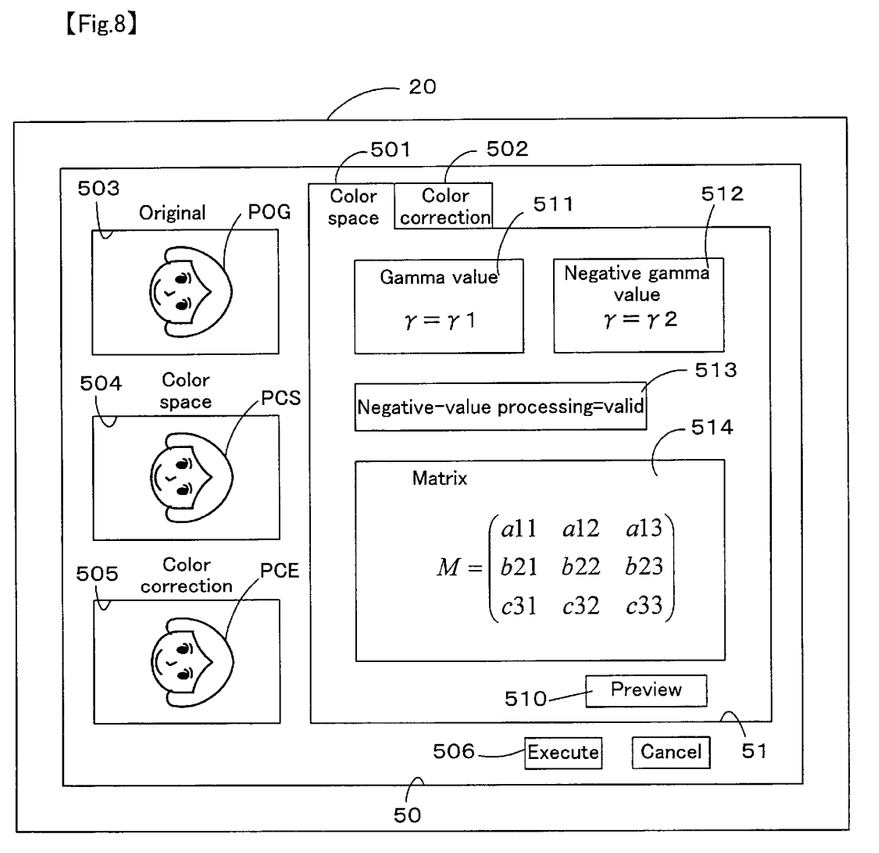
FIG. 8 is a diagram depicting an example of the setup screen that appears on the display screen of the display device 230 when color-space information is set in the image file generating process according to the present embodiment.
Figure 9:
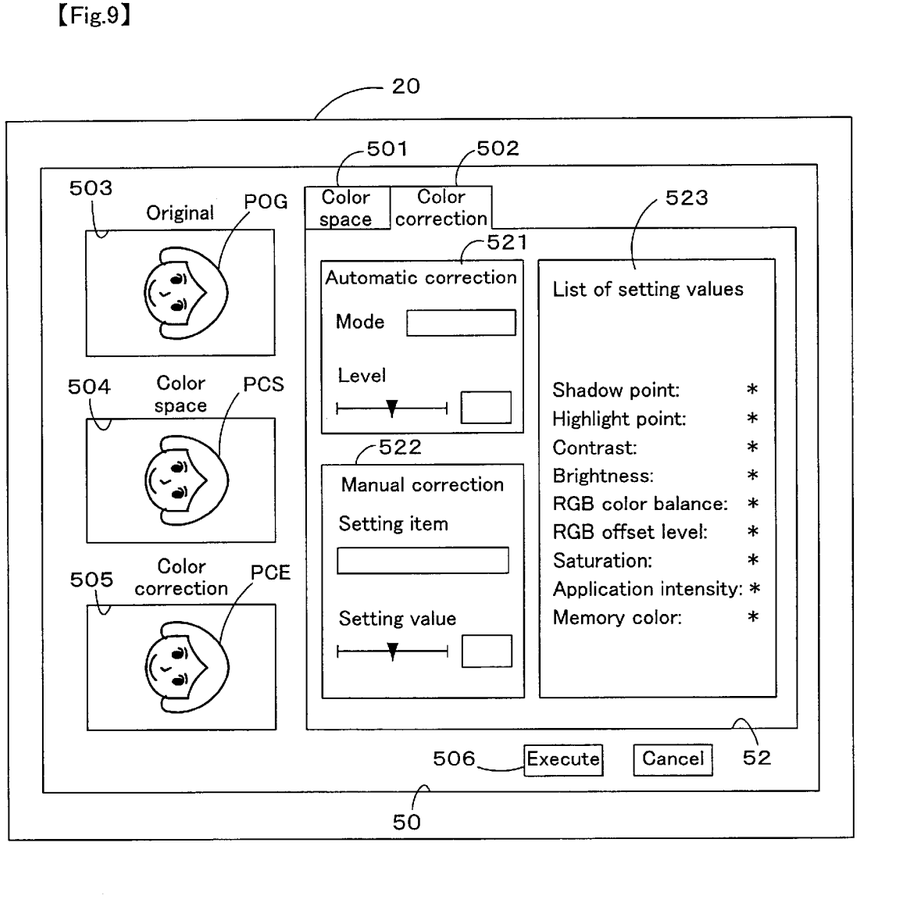
FIG. 9 is a diagram depicting an example of the setup screen that appears on the display screen of the display device 230 when color-correction information is set in the image file generating process according to the present embodiment.

The image file generating process executed in the image file generating device (personal computer PC) relating to the present embodiment will be described with reference to FIGS. 5–9. FIG. 5 is a flowchart depicting the processing routine involved in the image file generating process executed in the personal computer PC. FIG. 6 is a flowchart depicting the processing routine involved in the image processing setup process within the image file generating process. FIG. 7 is a diagram depicting an example of the image display screen that appears on the display screen of a display device 230 when a original image file is opened. FIG. 8 is a diagram depicting an example of the setup screen that appears on the display screen of the display device 230 when the color space information is set in the image file generating process according to the present embodiment. FIG. 9 is a diagram depicting an example of the setup screen that appears on the display screen of the display device 230 when the color correction information is set in the image file generating process according to the present embodiment.

The present processing routine is initiated as a result of an execution request issued via the input device 240. For the sake of simplicity, the object image data for processing in the present processing routine are assumed to be JPEG image data. When any JPEG image data are selected via the input device 240, the CPU 200 converts the selected JPEG image data to RGB image data and displays a base dialog 40, which contains three images, on the display device 230, as depicted in FIG. 6 (step S100). Whereas image data displayable by the display device 230 are RGB image data, the image data color space is converted from YCbCr color space to RGB color space, since JPEG image data consist of image data that are usually displayed in YCbCr color space.

The base dialog 40 has display embodiments comprising a original-image display area 41 for displaying the original image OG, a color-space conversion image display area 42 for displaying a color-converted image CS after color-space conversion processing, and a color-correction image display area 43 for displaying a color-corrected image CE after color-correction processing. The results of color-space conversion processing and color-correction processing in the original image can be easily confirmed by employing such embodiments. The original image OG is displayed in any of the display areas 41, 42, and 43 in an initial state in which the image data is first opened.

The CPU 200 determines whether or not a request for configuration of color space or color correction in the image processing setup process has been issued (step S110). For example, the CPU 200 determines that a request in the image processing setup process has been issued when the "image processing setup" button 44 (see FIG. 6) on the toolbar is clicked via the input device 240. When the CPU 200 determines that a request has been issued in the image processing setup process (step S110: Yes), the image processing setup process is executed (step S120). If the CPU 200 determines that a request has not been issued in the image processing setup process (step S110: No), the CPU 200 operates in standby.

The image processing setup process will now be described with reference to FIGS. 6–9. The image processing setup process is executed while being displayed in the image processing setup dialog 50 depicted in FIGS. 8 and 9. A color-space setup item subdialog 51 is displayed in the image processing setup dialog 50 (the display condition depicted in FIG. 8) by a process in which the "color space" tab 501 displayed on the dialog 50 is clicked using the input device 240, and a color-correction setup item subdialog 52 is displayed in the image processing setup dialog 50 (the display condition depicted in FIG. 9) by a process in which the "color correction" tab 502 displayed on the dialog 50 is clicked using the input device 240. In addition, the color space setup item subdialog 51 is first displayed on the dialog 50 when the image processing setup button 44 is clicked in the present embodiment.

An original-image display area 503 for displaying an original preview image POG, a color-conversion image display area 504 for displaying a color-space converted preview image PCS that reflects color-space conversion processing, and a color-correction image display area 505 for displaying a color-corrected preview image PCE that reflects color-correction processing are arranged as separate areas on the left side of the dialog 50 depicted in FIGS. 8 and 9.

The CPU 200 determines whether or not a color-space setup request has been issued (step S1210). As previously mentioned, the present embodiment is configured such that if the image processing setup button 44 is clicked, the color-space setup item subdialog 51 is first displayed on the dialog 50, so the CPU 200 determines that a color-space setup request has been issued as long as the color-correction tab 502 is not clicked. When the CPU 200 determines that a color-space setup request has been issued, (step S1210: Yes), the color-space setup process is executed (step S1220). In contrast, the CPU 200 executes the hereinafter described color-correction setup process (step S1250) when a color-space setup request has not been issued (specifically, when the CPU 200 determines that a color-correction setup request has been issued (step S1210: No)).

The color-space setup item subdialog 51 contains a gamma-value setting item 511 for setting the proper gamma value for use in gamma-correction processing of positive RGB image data, a negative-gamma value setting item 512 for setting the proper gamma value for use in gamma-correction of negative RGB image data, a negative-value processing setting item 513 for specifying whether or not the negative RGB image data will be utilized (made available) without clipping, and a matrix setting item 514 for setting matrix values in the color conversion matrix used in color-space conversion. The color-space setup process is executed by directly inputting numerical values for each parameter value into these setting items, or by selecting numerical values.

The CPU 200 operates in standby (step S1230: No) until a request for a preview of the color-space setup image is generated. The CPU 200 determines that a preview request has been generated when the preview button 510 displayed in the color-space setup item subdialog 51 is clicked using the input device 240. When the CPU 200 detects the generation of a color-space setup image preview (step S1230: Yes), an image reflecting the color-space parameter thus set is displayed on the color-conversion image display area 504 and on the color-correction image display area 505 (step S1240). As used in the present embodiment, the term "input of a preview request" refers to the application (definition) of the parameter value thus entered. To reflect color-space parameter values in accordance with the present embodiment, original image data values are used as input values without being modified as such with the parameter values thus set, output values are obtained by applying the parameter values thus set to the input values, and display images that reflect the color-space parameter values are displayed.

When the color-correction tab 502 is clicked, the CPU 200 executes the color-correction setup process of the color correction tab 502 (step S1250). When the CPU 200 detects that the color-correction tab 502 has been clicked, the CPU 200 causes the color-correction setup item subdialog 52 to be displayed on dialog 50. The color-correction setup item subdialog 52 comprises an automatic-correction setting item 521, a manual-correction setting item 522, and a setting value list display item 523. Parameters including shadow point, highlight point, contrast, brightness, RGB color balance, RGB offset level, saturation, application intensity, and memory color are established in the color-correction setup process. The setting values for each of these parameters are either set automatically by selecting a correction mode optimized for each set of photo conditions (photo scenes), or the setting items are selected as desired and set manually.

Figure 10:
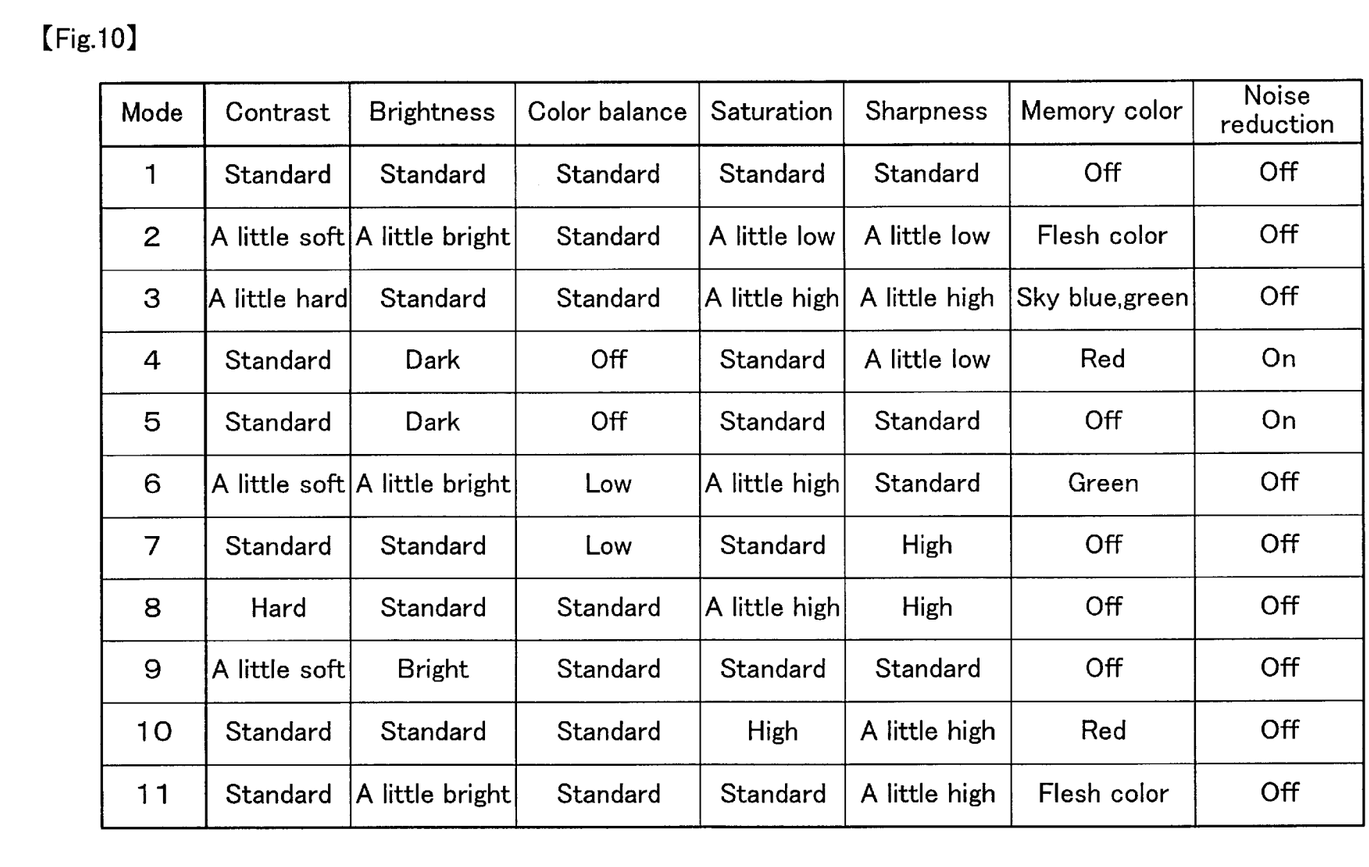
FIG. 10 is a diagram depicting an example of the combinations of parameters in the correction modes, with numbers designating the correction modes.

Modes such as those depicted, for example, in FIG. 10 may be used as correction modes. FIG. 10 is a diagram depicting an example of the combinations of each parameter in the correction modes, with numbers designating the correction modes. The contrast and brightness items for each correction mode show the condition of the image quality obtainable as a result of automatic correction in a user-friendly fashion, and either single or multiple parameter values are set for each item to carry out the selected correction mode. Correction mode 1 may, for example, be adapted to color-correct for standard photo conditions (generating conditions); correction mode 2 may, for example, be adapted to color-correct for portrait photo conditions; correction mode 3 may, for example, be adapted to color-correct for landscape photo conditions; correction mode 4 may, for example, be adapted to color-correct for twilight photo conditions; correction mode 5 may, for example, be adapted to color-correct for nighttime photo conditions; and correction mode 6 may, for example, be adapted to color-correct for photo conditions such as those involved in photographing flowers. Correction mode 7 may, for example, be adapted to correct for photo conditions relating to macro shots; correction mode 8 may, for example, be adapted to correct for photo conditions such as those involved in photographing people engaging in sports; correction mode 9 may, for example, be adapted to correct for backlit photo conditions; correction mode 10 may, for example, be adapted to correct for photo conditions such as those involved in photographing autumn leaves; and correction mode 11 may, for example, be adapted to correct for photo conditions such as those relating to commemorative shots.

The automatic-correction setting for selecting a correction mode is set via the automatic-correction setting item 521. The application level for each of the set parameter values can also be set at the time of automatic correction. Manual setting of desired parameter values performed via the manual-correction setting item 522 is performed in order to change parameter values selected by the correction mode, or to set a certain parameter value for the desired parameter without utilizing a correction mode. The setting values that are set for each parameter are thus displayed on the setting-value list display item 523.

When a correction mode is selected, and when a desired parameter value is set, the CPU 200 displays in each case an image on the color-correction image display area 505 that reflects the color-correction parameter value that was set (step S1260). The CPU 200 repeatedly executes steps S1250–S1260 until color correction setup is completed (step S1270: No). Specifically, the CPU 200 redraws the image displayed on the color-correction image display area 505 each time the color correction parameter values change. Also, to reflect the color-correction parameter values without altering the image data values of the original themselves, the set color-space parameter value is applied to input values consisting of the image data values of the original to obtain a color-space image, the color-space image data values are then used as input values, and a color-correction image is displayed by applying the color-correction parameter values.

When the CPU 200 detects that color-correction setup is complete, specifically, when the CPU 200 detects completion of the image processing setup process (step S1270: Yes), the CPU 200 closes the image processing setup dialog 50, finishes the present processing routine, and returns to the processing routine depicted in FIG. 5. The CPU 200 detects the completion of color correction setup when the execution button 506, which is displayed in the image processing setup dialog 50, is clicked by means of the input device 240.

Returning to FIG. 5 to continue the description, the CPU 200 redefines the images on the color-space conversion image display area 42 and the color-correction image display area 43 and redisplays the base dialog 40 on the display device 20 (step S130) to reflect each parameter value that was set in the image processing setup process. The CPU 200 stores the combination of each parameter value that was set in the image processing setup process as a single image processing condition (image processing condition file) on the HDD 220. At the time of storing, files may be given a new file name as desired, or an existing image processing condition may be overwritten using an existing filename.

The CPU 200 determines whether or not a generation request for an image file GF has been issued (step S150). A generation request for an image file GF is issued when, for example, the file save command 45 displayed on the base dialog 40 toolbar is clicked via the input device 240. When it is determined that a generation request for an image file GF has been issued (step S150: Yes), the CPU 200 generates an image file GF (step S160) relating the image data of the original to the image processing condition that was set. More specifically, the CPU 200 writes the image processing condition as the image processing control information CI in the Makernote data storage area 113 of the original image data (image file), as described with reference to FIGS. 2–4. The image data and the image processing control information CI are thus mutually linked and contained within a single image file GF.

If the CPU 200 determines that a generation request for an image file GF has not been issued (step S150: No), an image file GF is not generated. The CPU 200 determines whether or not a print request has been issued (step S170). Since the personal computer PC is connected to a color printer 30 in the present embodiment, the results reflecting the image processing conditions set by means of the image processing setup process can be confirmed using the image output from the color printer 30.

When it is determined that a print request has been issued (step S170: Yes), the CPU 200 executes the printing process (step S180) and finishes the present processing routine. A printing request is issued when, for example, the print command 47 displayed on the base dialog 40 toolbar is clicked via the input device 240. When the CPU 200 has determined that a printing request has been issued (step S170: No), the CPU 200 finishes the present processing routine.

The three images comprising the original image, the color-space converted image, and the color-corrected image can be printed on one sheet of paper at the time of printing. Printing may also be performed so that the set parameter values are printed in the vicinity of both the color-space converted image and the color-corrected image.

When the printing process is executed, the CPU 200 may, for example, extract the image data that reflect the set image processing conditions to the HDD 220 or RAM 210 workspace and send the data to the printer 30 as raster data.

Figure 11:
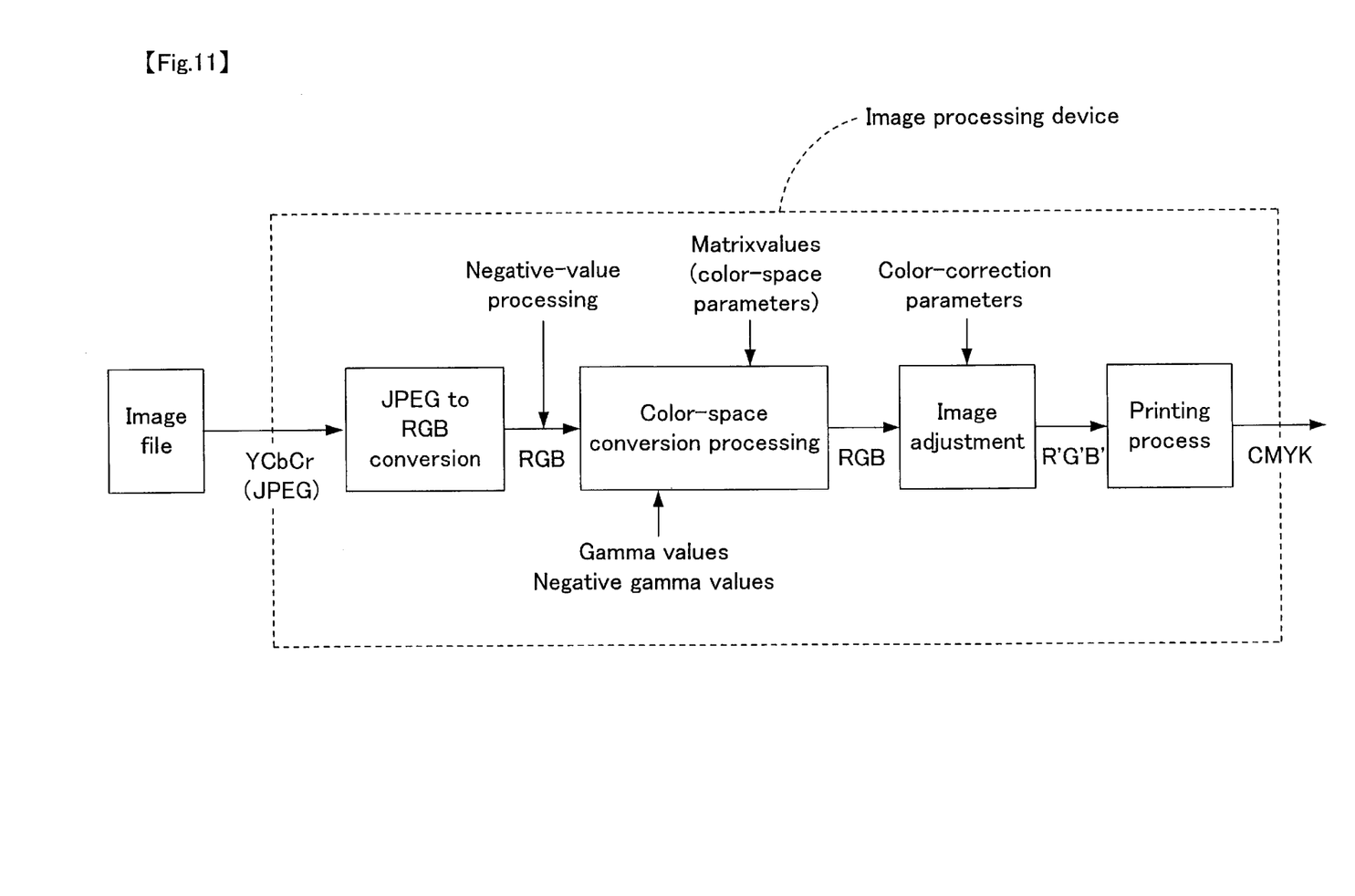
FIG. 11 is a block diagram depicting the sequence of image processing in an image processing device capable of performing image processing using an image file that is generated according to the present embodiment.

Following is a brief description (with reference to FIG. 11) focusing on the manner in which image processing control information CI contained in an image file GF is used for image processing and printing in an image processing control device (for example, a personal computer PC or printer 30) capable of interpreting the image processing control information CI (and performing image processing) from an image file GF generated by the image file generating device relating to the present embodiment. FIG. 11 is a block diagram depicting the sequence of image processing in an image processing device that is capable of image processing using an image file that is generated according to the present embodiment.

When an image file GF is received, the image processing device 70 converts the image data color space from a YCbCr color space to an RGB color space. The image processing device 70 refers to the negative-value processing parameters and uses the minus data contained in the RGB data that were converted from YCbCr data within the image processing control information CI (color space parameter) to determine whether or not to perform subsequent processing. Minus data are used as valid values without clipping when negative value processing parameters indicate negative-value validity, and when minus value processing parameters indicate negative-value invalidity, the minus data are, for example, clipped to the sRGB color-space color specification range. All data that are outside a prescribed color space constitute minus data, such as data that are outside the color specification range of an sRGB color space. The result is that if an sRGB color space is defined by values from 0 to 255, the minus data would include values of 256 and higher, which exceed the color specification range of the sRGB color space.

The image processing device 70 refers to gamma values, negative-gamma values (when minus values are valid), and matrix values from within the image processing control information CI (color-space parameters) to execute gamma-correction processing and color-space conversion processing of RGB data. Color-space conversion processing is executed by converting RGB data into XYZ data using a 3×3 matrix (M), and then converting XYZ data into RGB data using the inverse matrix of another matrix.

The image processing device 70 refers to color-correction parameters within the image processing control information CI to execute image adjustment processing of image data for which color-space conversion processing has been executed. During image adjustment processing, output values for the image data input values are adjusted by interpreting the correction mode, or by using the directly-specified parameter values.

The image processing device 70 executes the printing process for the image data to which image adjustment has been applied. Halftone processing and conversion of RGB data to CMYK data are executed in the printing process. Last of all, the image processing device 70 outputs the obtained image data to the printer as raster data.

As described above, the image file generating device relating to the present embodiment allows image processing control information CI to be added to an image file otherwise not provided with image processing control information CI that specifies image processing conditions for image processing. Therefore, an image file GF capable of executing the desired image processing can be generated in an image processing device capable of interpreting image processing control information CI and executing image processing.

When the image processing control information CI (image processing conditions) to be added to the image file GF are set, the values for the color-space parameters and the color-correction parameters can be set with reference to the image processing results that are concurrent with changes in parameter values, because the image file generating device relating to the present embodiment displays the original image OG, the color-converted image CS, and the color-corrected image CE simultaneously with the original preview image POG, the color-converted preview image PCS, and the color-corrected preview image PCE.

D. Other Embodiments

Each parameter value was determined and the image processing control information CI was set without taking into account the Exif information contained in the processing-object image file GF in the abovementioned embodiments. However, the Exif information from the processing-object image file GF may be read and analyzed, and the image processing control information CI may be set on the basis of the analyzed Exif information. For example, the appropriate values for the color-space parameters and the color-correction parameters may be obtained from the memory device by coordinating the values for each parameter contained in the Exif information with the values for each set parameter in the image processing control information CI, storing them in the memory device in advance, and analyzing the read Exif information; or more specifically, the device may be designed such that appropriate values are generated as needed, and the image processing control information CI is set automatically. In such a case, the image processing control information CI for an image file GF can be added in a stand-alone printer, without going through a personal computer PC.

In the case wherein the shooting mode that was set on a digital still camera 12 is recorded as Exif data, the image file generating device may be designed such that a correction mode that is appropriate to the photographing mode obtained by analyzing the recorded photographing mode is selected by means of the CPU 200. In such a case, an image file in which the image data more closely reproduce the photographer's plan can be generated, because image processing control information CI can be generated according to the photographing mode.

It is also possible to display an image that reflects the color-space parameter values and the color-correction parameter values that are set on the basis of the Exif information, and to further change the color-space parameter values and the color-correction parameter values using the displayed image as a base. In such a case, the broad image processing conditions are set by consulting with the Exif information, so image processing conditions that will yield the desired results can be obtained by adjusting the detailed settings only.

Furthermore, the printing properties (printer driver parameter values) of the printer 30 may be set in addition to the image processing conditions in an image file generating device containing a printer. In such a case, there is no need for the user to set printing properties such as the type of print medium, resolution, and print direction on the printer driver setup screen, because the printer 30 is set on the basis of the output control information CI. It is also possible to avoid the risk that the user will set printing properties that are inappropriate for the image data, thus preventing a decline in printing quality caused by setting inappropriate printing properties. The user can thus more reliably obtain the printing results intended by the person who generated the image file.

The abovementioned embodiments were each described with reference to cases in which image processing control information CI for a single output device was added within an image file GF. However, the image file generating device may also be designed such that output control information for multiple output devices that have various output characteristics is stored within the image file GF. In such a case, the image processing and the image output control of the image data GD can be executed on the basis of the PrintMatching data acquired by providing the image file generating device with the capacity (components) to identify PrintMatching data that are designated by each output device itself and to acquire these data from the image file GF. The appropriate image output conditions can thus be controlled in a plurality of output embodiments.

The image file generating device relating to the present invention has been described above based on embodiments. However, the embodiments of the abovementioned invention are merely intended to simplify understanding of the present invention and do not limit the present invention. It is considered to be a matter of course that the present invention encompasses all equivalents to the present invention, and can be changed or modified as long as no deviation is made from the object and claims of the present invention.

The abovementioned embodiments envisage using the gamma value as a color-space parameter, employing parameters such as the color-space matrix and negative-value processing, and utilizing parameters such as shadow point, highlight point, and contrast as color-correction parameters. However, the decision as to which of these setting parameters to use can be made in an arbitrary manner.

The parameter values shown in the table in FIG. 10 are mere illustrations, and the invention relating to the present application is not limited by the illustrated values.

The image file generating device was described using a digital still camera 12 as an imaging device in the abovementioned embodiments. However, a scanner, a digital video camera, or the like may be used in addition to a digital still camera 12. A liquid-crystal display, a CRT display, a projector, or the like may be used as an output device in addition to a printer.

The image file generating device was described in the above-mentioned embodiments with an Exif-format file exemplifying an embodiment of an image file GF. However, the image file format usable in the image file generating device relating to the present invention is not limited to the Exif format. Specifically, it is sufficient that the file be capable of containing the image data to be output by the output device and also containing the image processing control information CI for specifying the image processing conditions of image data in the image processing device. This is because this kind of file enables the image file generating device to generate an image file containing the image data and the image processing control information CI.

The image file GF containing image data and output device control information CI also contains a file wherein image data can be associated with image processing control information CI at the time of image processing by referring to association data associated with the image processing control information CI, which are generated in the image file GF and stored in a file that is independent from the image data or the image processing control information CI. This is because although in this case the image data and the image processing control information CI are stored in separate files, the image data and the image processing control information CI are still in an inseparable integral relation when image processing is performed using the image processing control information CI, allowing this unit to function in substantially the same manner as if the image data and the image processing control information CI were stored in the same file. Specifically, the image file GF in the present embodiment encompasses embodiments in which the image data and the image processing control information CI are used in association with one another, at least during image processing.

What is claimed is:

1. An image file generating device for generating an image file containing image processing control information for specifying processing conditions for image data in an image processing device, said image file generating device comprising:

an original-image data display unit for displaying input image data;

an image processing condition setup unit for setting the image processing conditions that are designed to be executed for the image data in the image processing device;

a reflected-image data display unit for displaying image data that reflect the set image processing conditions;

an image processing condition selection unit for selecting image processing conditions that are set for the displayed reflected-image data;

an image processing control information generation unit for generating image processing control information on the basis of the selected image processing conditions; and an image file generating unit for generating an image file in which the generated image processing control information and the input image data are associated and stored.

2. An image file generating device according to claim 1, wherein the image processing condition setup unit contains an image processing condition display unit for displaying the set image processing conditions.

3. An image file generating device according to claim 2, wherein the image processing conditions that are set by the image processing condition setup unit include at least one of either color-space conversion processing conditions or color-correction processing conditions.

4. An image file generating device according to claim 1 further comprising:

a memory device for storing scene-specific processing conditions in which a plurality of image processing parameters is combined in advance according to photo scenes; and wherein the image processing conditions set by the image processing condition setup unit includes said scene-specific processing conditions.

5. An image file generating device according to claim 3 or claim 4, wherein the original-image data display unit and the reflected-image data display unit display the image data side-by-side on the same screen as the image data that reflect the image processing conditions.

6. An image file generating device according to claim 5 further comprising:

a printing unit for printing the image data that reflect the set image processing conditions together with the display of the set image processing conditions.

7. An image file generating device for generating an image file which contains image processing control information that specifies processing conditions for image data in an image processing device, said image file generating device comprising:

an image data input unit for inputting image data that accompany generation information from a time of generation;

an image data analysis unit for analyzing said generation information;

an image processing control information generating unit for generating image processing control information that specifies conditions for image processing of the image data in the image processing device on the basis of results of said analysis; and an image file generating unit for generating an image file in which the generated image processing control information and the input image data are associated and stored.

8. An image file generating device according to claim 7, wherein model information about a model of the imaging device in which the image data are generated is contained in the generation information, and the image processing control information is generated according to a manner in which said model information is combined with the image output device.

9. An image file generating device according to claim 7 or claim 8, wherein information indicating an imaging arrangement at the time of image data generation is contained in the generation information, and the image processing control information is generated on a basis of the information indicating an intended imaging arrangement.

10. An image file generating device according to claim 9, wherein the information indicating the intended imaging arrangement includes an imaging scene that is set in the imaging device.

11. An image file generating device according to any one of claims 7–10, wherein color-space information and color-correction information are contained in the image processing control information.

12. An image file generating device according to any one of claims 7–10, wherein the image data comprise Exif data which contain image data components and Exif data components for storing photo information, and the generation information includes the photo information contained in said Exif data components.

13. An image file generating device according to claim 7 further comprising:

an image processing condition setup unit for setting the desired image processing conditions for the image data; and wherein the image processing control information is generated on a basis of the set image processing conditions in addition to the analyzed generation information.

14. A computer-readable medium which contains program instructions for generating image files, said computer-readable medium comprising:

program instructions for inputting image data;

program instructions for producing on a display screen of a display device an image processing condition setup area for setting image processing conditions for image data thus input;

program instructions for producing an original-image display area for displaying said input image data on the display screen;

program instructions for producing a reflected-image display area for displaying image data that reflect the set image processing conditions next to said original-image display area on the display screen;

program instructions for generating image processing control information whereby processing conditions are specified for the image data in the image processing device on a basis of the set image processing conditions when image processing conditions are selected for image data displayed in the reflected-image display area; and program instructions for generating an image file in which the generated image processing control information and the input image data are associated and stored.

15. A computer-readable medium according to claim 14, wherein color-space conversion conditions and color-correction conditions are included in conditions set as said image processing conditions, and said reflected-image display area contains a first reflected-image display area for reflecting the color-space conversion conditions thus set and a second reflected-image display area for reflecting the color-correction conditions thus set.

16. A computer-readable medium according to claim 15 further comprising:

program instructions for printing the image data that reflect the set image processing conditions together with the display of the set image processing conditions.

17. A computer-readable medium containing program instructions for image file generation, wherein said computer-readable medium comprises:

program instructions for inputting image data that include as generation conditions at least one of either generated information about a model of the imaging device, or the imaging conditions at a time of generation;

program instructions for analyzing said generation conditions;

program instructions for generating, on a basis of the generation conditions thus analyzed, image processing control information that specifies image processing conditions for the image data in an image processing device; and program instructions for generating an image file in which the generated image processing control information and the input image data are associated and stored.

18. An image file generating device for generating an image file containing image processing control information for specifying processing conditions for image data in an image processing device, said image file generating device comprising:

original-image data display means for displaying input image data;

image processing condition setup means for setting image processing conditions that are designed to be executed for the image data in the image processing device;

reflected-image data display means for displaying image data that reflect the set image processing conditions;

image processing condition selection means for selecting image processing conditions that are set for the displayed reflected-image data;

image processing control information generation means for generating image processing control information on a basis of the selected image processing conditions; and image file generating means for generating an image file in which the generated image processing control information and the input image data are associated and stored.

19. An image file generating device according to claim 18, wherein the image processing condition setup means contain image processing condition display means for displaying the set image processing conditions.

20. An image file generating device according to claim 19, wherein the image processing conditions that are set by the image processing condition setup means include at least one of either color-space conversion processing conditions or color-correction processing conditions.

21. An image file generating device for generating an image file which contains image processing control information that specifies processing conditions for image data in an image processing device, said image file generating device comprising:

image data input means for inputting image data that accompany generation information from a time of generation;

image data analysis means for analyzing said generation information;

image processing control information generating means for generating image processing control information that specifies conditions for image processing of the image data in the image processing device on a basis of results of said analysis; and image file generating means for generating an image file in which the generated image processing control information and the input image data are associated and stored.

22. An image file generating device according to claim 21, wherein model information about a model of the imaging device in which the image data are generated is contained in the generation information, and the image processing control information is generated according to a manner in which said model information is combined with the image output device.

23. An image file generating device according to claim 21 or claim 22, wherein information indicating an imaging arrangement at the time of image data generation is contained in the generation information, and the image processing control information is generated on a basis of the information indicating an intended imaging arrangement.

* * * * *